April 23, 1968  P. VITRY  3,379,616
HEAT EXTRACTION DEVICE FOR NUCLEAR REACTOR
Filed July 5, 1966  3 Sheets-Sheet 1

INVENTOR
PIERRE VITRY

BY Bacon & Thomas
ATTORNEYS

INVENTOR
PIERRE VITRY
BY
Bacon & Thomas
ATTORNEYS

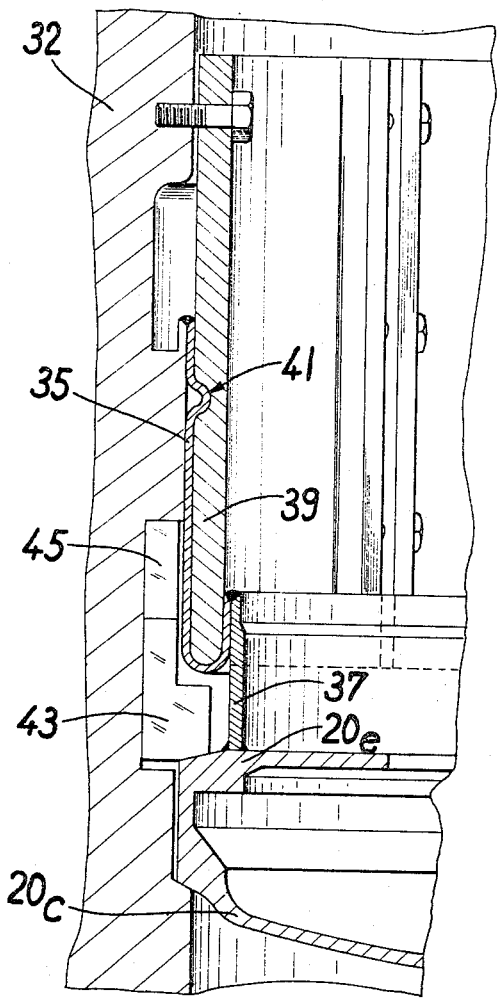

United States Patent Office
3,379,616
Patented Apr. 23, 1968

3,379,616
HEAT EXTRACTION DEVICE FOR
NUCLEAR REACTOR
Pierre Vitry, Paris, France, assignor to Societe Indatom,
Paris, France
Filed July 5, 1966, Ser. No. 562,630
Claims priority, application France, July 9, 1965,
24,234
8 Claims. (Cl. 176—60)

ABSTRACT OF THE DISCLOSURE

Each of a plurality of heat exchangers includes a support plug, a blower and a heat exchanger in spaced, axial alignment. The end of the heat exchanger, remote from the blower and plug, has a close sliding fit in an opening in the primary fluid circuit of the reactor. Headers for conducting the heat exchanger fluid extend through the plug from the exterior of the reactor vessel.

---

Figure 1:
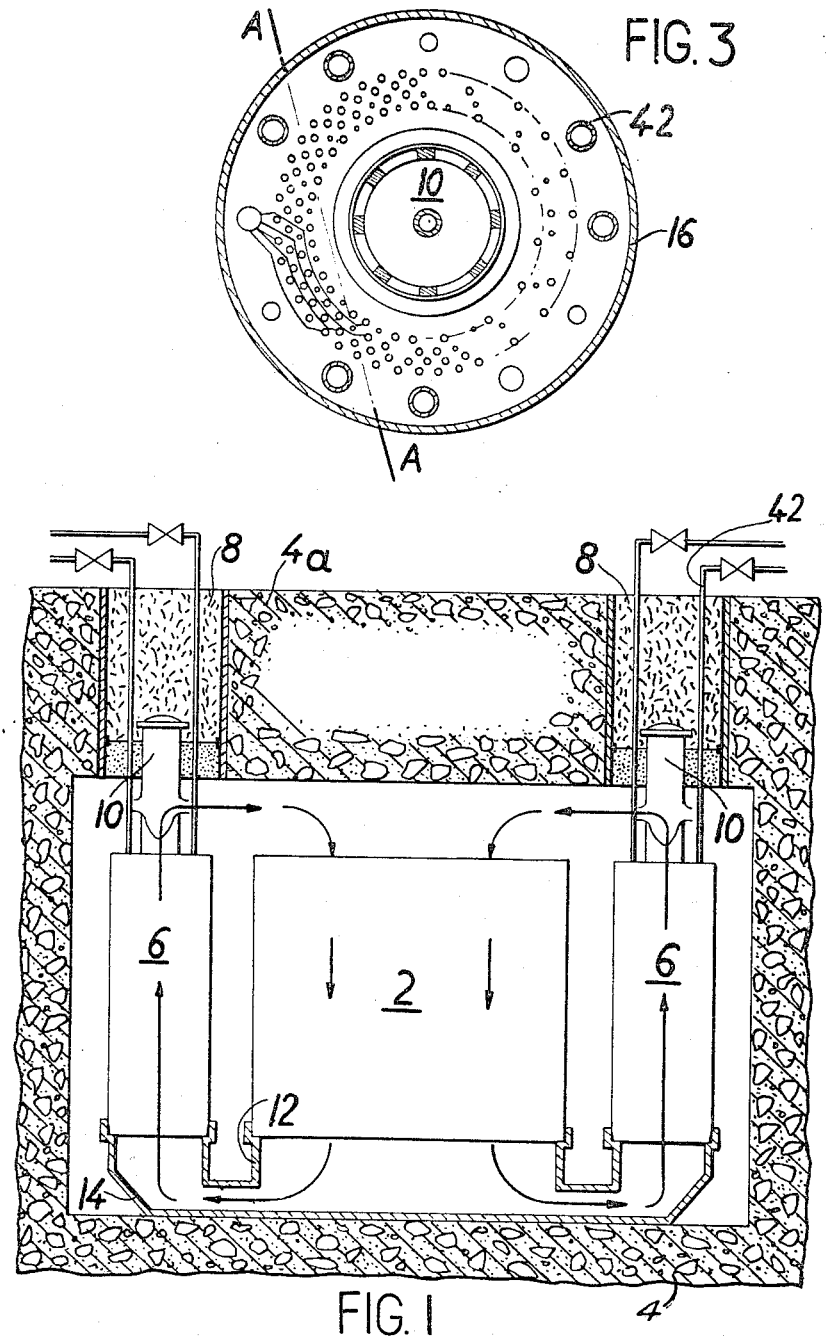

This invention relates to a heat extraction device, more particularly for a nuclear reactor of the integral exchanger type, viz, a reactor in which the reactor core and the heat exchangers are enclosed in a common pressure-resistant and biological-protection casing, or vessel.

In reactors of this type, the flow of the primary cooling fluid, generally a gas, has hitherto been controlled by blowers mounted in orifices in the vessel and connected to the outlet of the heat exchangers, while the secondary heat extraction fluid enters the exchanger and leaves it through tubes which also pass through the vessel.

In the event of a leakage of secondary fluid to the primary circuit as a result of a fault or fracture of the exchanger tube, the exchanger portion containing the faulty tube can immediately be isolated from outside the vessel by automatic valves without reactor operation being disturbed excessively, so that reactor shutdown is possible in complete safety to allow operations to be carried out on the faulty tube.

However, in the event of a more general accident, e.g. fracture of a number of tubes, one or more exchangers may have to be repaired inside the vessel, or be withdrawn, in which case entry to the interior of the vessel is necessary after reactor shutdown in order to disconnect the exchanger from all the reactor elements before withdrawal through a vessel aperture.

Such operations inside the vessel are possible with reactors of the graphite-gas type, in which the level of contamination of the primary circuit is normally low, but with high-temperature reactors using a fuel in the form of particles of fissile material coated in pyrolytic graphite, which are either contained in prismatic elements or simply produced in the form of spherical elements, such operation inside the reactor is difficult because of contamination of the primary coolant and hence the interior surfaces of the vessel.

The object of the present invention is to obviate this disadvantage and eliminate any need for operation inside the reactor for withdrawal of the exchanger.

The invention relates to a heat extraction device for a nuclear reactor of the integral exchanger type, wherein cooling gas blowers are disposed in orifices in the vessel, which contains a detachable plug to close the vessel orifice, a blower for circulation of a primary cooling fluid secured to the centre of said plug, a heat exchanger coaxial with said blower and secured to the same plug in extension thereof, a rectilinear conduit coaxial with the system for communication between the intake to the blower and the exchanger, a cylindrical housing for securing the exchanger to the plug, such housing surrounding the rectilinear conduit, and rectilinear headers for entry and exit of the extraction fluid, such headers extending through the plug around the blower and being connected at one end to tubes of the fluid circuit inside the housing and at the other end to an external utilization circuit.

The entire cooling system is thus rigidly secured to the plug bearing the blower and is no longer welded to any element permanently secured inside the vessel; the other parts of the reactor are therefore in no way affected by the displacement, i.e. installation or withdrawal of the system by a vertical movement.

In addition, the small size of this device enables standard interchangeable elements to be produced which can be disposed in varying numbers in a reactor.

Figure 2:
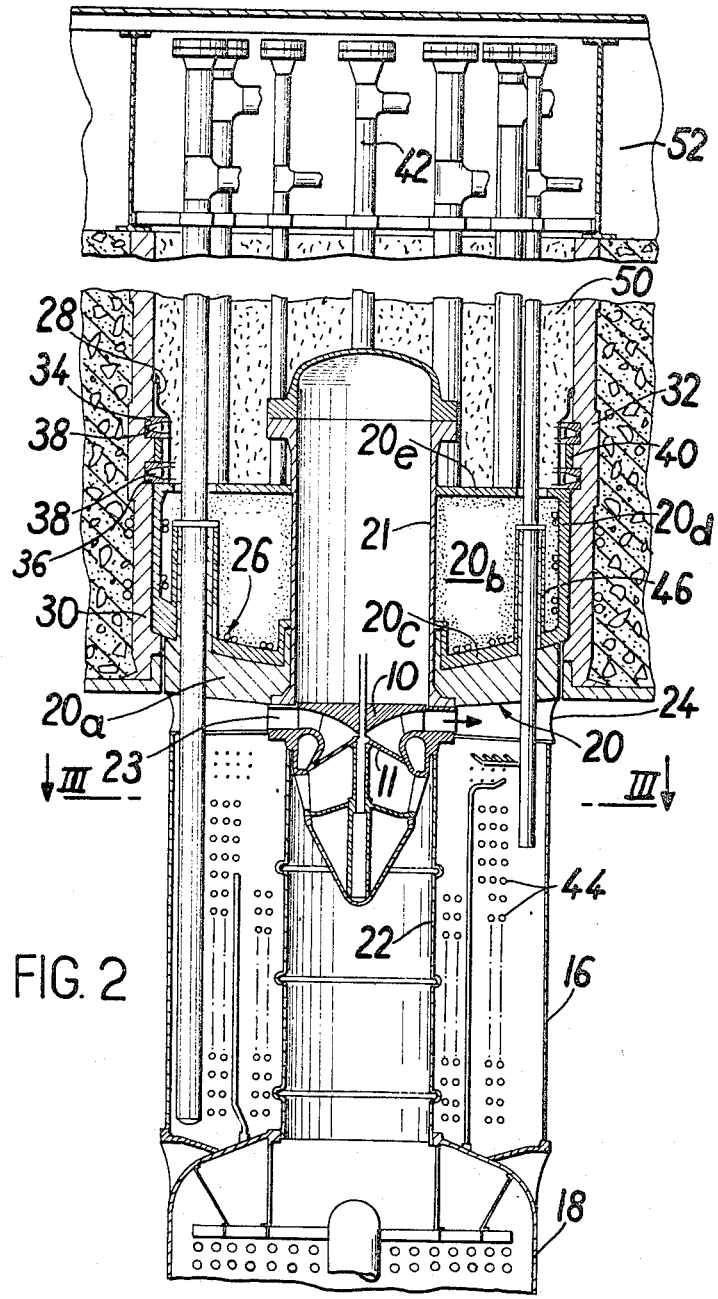

The invention will now be described by way of example with reference to the accompanying drawings in which:

FIGURE 1 is a diagram of one embodiment of a nuclear reactor provided with a heat extraction device according to the invention, FIGURE 2 is a longitudinal section of a heat extraction device in position in the reactor, only the top part of the exchanger being shown, FIGURE 3 is a section on the line III—III in FIGURE 2, and FIGURE 4 is an enlarged-scale view of a modification of the system for locking and sealing the device in a reactor.

In the embodiment of a nuclear reactor as shown in FIG. 1, the core 2 is disposed at the centre of a prestressed concrete vessel 4 and the heat extraction system is disposed all around it. This system consists of a number of devices 6 which form the subject of the invention; the top slab 4a of the vessel is formed with a corresponding number of orifices 8 each containing one of these devices 6.

The primary cooling fluid is a gas, for example helium, which flows through the reactor core and at the bottom part thereof is guided by a skirt 12 to the entry to the devices 6 which are disposed slidably with very little clearance in the opening of an extension 14 of the skirt 12. The vertical thermal expansion of the device with respect to the internal structures of the reactor can therefore take place freely.

Each of these devices comprises a heat exchanger 18 secured to a cylindrical housing 16 (FIG. 2) rigidly secured to the bottom part of a single plug 20 which closes the corresponding orifice 8.

In the centre of the housing 16 a conduit 22 connects the outlet of the exchanger 18 to the intake of a vertical-axis blower 10 secured to the centre of the plug 20, the delivery 23 of the blower being directed substantially parallel to the inner wall of the vessel 4 towards the apertures 24 in the cylinder 16.

Plug 20 has a thick pressure-resistant steel wall 20c cooled by a flow of water in tubes 26, said wall forming an extension of the steel lining of the vessel, and a thermal insulation 20a held against the wall 20c. The outer edge of the wall 20c bears on an inner rim 30 of the entry orifice 8 by a conical surface and continues in the form of a ring 20d closed at the top by a plate 20e. The system consisting of the plates 20e and 20c and the ring 20d supports the blower casing 21 and is filled with a biological protection material 20b, preferably concrete.

As shown in FIG. 2, the distance between the wall 20c and the plate 20e is large so as to avoid any blower vibration.

The system is locked in a ring 32 reinforcing the entry aperture 8, such ring preferably being of steel, for example by means of two superposed locking systems each consisting of two rings 34, 36 disposed in a groove in the wall 32 and spaced by a conical-section gasket 38, the bottom ring 36 of one of the locking means bearing on the wall 20e while that of the other bears on a ring 40 in contact with the first system.

Sealing is provided by a thin steel bellows 28, one end of which is welded to the ring 32 and the other to the plate 20e between the rings and the thermal insulation.

According to a modified embodiment shown in FIG. 4, a sealing bellows 35 is bent into the form of a U at its end for fixing to a flange 37 integral with the plate 20e. It is protected from deformation by a ring 39 consisting of a number of annular elements inter-connected by a screw system for adjusting their spacing. A bend 41 in the bellows 35 co-operates with a groove in the ring to allow thermal expansion of the bellows.

In this case locking is preferably obtained by two series of trapezoidal wedges 43, 45 which are clamped against one another, the wedges 43 of one of these series bearing against the plate 20e while those of the other 45 are clamped against the wall of a groove in the ring 32.

All round the blower 10, the plug 20 has a number of headers 42 extending through it to provide entry and exit for the exchanger heat extraction fluid, e.g. the input and output headers of a water and vapour circuit, the headers 42 being connected in the interior of the housing 16 at the ends of the exchanger tubes 44.

The headers 42 are fixed in thermal bushes 46 which continue the wall 20c in the biological screen 20b. They are thermally insulated and then pass through a pulverulent material 50 which fills the entry aperture 8 and which is a continuation of the biological protection of the vessel, and are connected to a circuit (not shown) outside the vessel. Valves (not shown) enable each header 42 to be shut off and thus automatically isolate from the exterior the circuit it controls, i.e. the heat-exchanger loops of the heat extraction device, in the event of fracture of a water or vapour tube for example.

Blower 10 also has a valve 11 to shut off the passage of the primary fluid in order to prevent any flow of hot gas in the exchanger when the extraction system is out of operation, for example as a result of the valves of all the headers 42 being closed and the blower being stopped.

The diameter of the plug 20 is at least equal to that of the exchanger 18. It is very much greater than that of the blower 10. The number of headers 42 can thus readily be increased so that the number of automatically isolatable loops can be increased, thus reducing the amount of water and vapour contained in each of these circuits. The total amount of fluid escaping into the primary circuit in the event of an exchanger tube fracture can thus be reduced. By way of example (FIG. 3), three headers are used for each circuit, i.e. three input headers to an economiser, there output headers from a superheater and six input and output headers for a resuperheater, said economiser, superheater and resuperheater not being shown in the drawing.

These headers are disposed in the plug around the blower 10 far enough away from the latter to allow the blower to be readily removed on its own.

Dismantling of the system can be carried out after shutdown and cooling of the reactor. After connection between the headers 42 and the external fluid circuit has been broken outside the vessel, for example from an attic 52, the material 50 is removed, the sealing bellows are unwelded and then the locking elements 34, 36 are dismantled. The system consisting of the blower 10, housing 16 and exchanger 18 is then lifted in the orifice 8 and withdrawn from the reactor by lifting means of any type disposed outside the vessel 4. The lifting means need not penetrate the interior of the vessel 4 but only has to reach the blower 10 and the plug 20. The exchanger 18 is moved away from the extension 14 of the skirt 12, FIG. 1, in which is simply slides, but no intervention is required in respect of this point. As it is extracted the device is disposed in an isolating case.

Replacement of the device after repair or of another similar device is carried out just as easily simply by lowering the device into the vessel then replacement of the locking elements, bellows, filling material and reconnecting the various circuits. Standard elements are also available for installation, such elements being of small size because of the axial arrangement of the blower and exchanger, and can be used in different types of reactor, the number of such elements varying according to the power required. These devices can also be disposed above the reactor core instead of being around the same, the cooling fluid then flowing up through the core and the exchangers being disposed at the top part of a skirt mounted above the latter. Again the number depends on the reactor power. A power of 700 mw.(th) would, for example, require the use of seven devices each of 100 mw.(th) or four devices each of 175 mw.(th).

Irrespective of the reactor configuration, serious accidents or damage to the elements of the cooling device can be repaired by withdrawing the damaged heat extraction device without any need to penetrate into the vessel itself, i.e., without any need to allow a very long period to elapse after reactor shutdown, the withdrawal operation itself requiring only a minimum of handling and thus being possible within a short period.

In the event of a partial incident, for example, to one of the tubes, it can be repaired conventionally by closing the valves of the corresponding heat extraction device, followed by reactor shutdown and blocking of the two ends of the damaged tube. The rectilinear shape of the headers allows them to be used as a passage for means for locating the damaged tube and for a tool for blocking its ends, said tool being secured, for example, to the end of a guide bar. Only this tube is then isolated and the others can continue to operate normally.

The number of headers and hence the number of tubes connected to each of them may vary with the power of the device and more particularly with the relative dimensions of the plug and the blower. The headers are usually spaced apart enough to be separated by a relatively considerable amount of material 50 and vessel prestressing cables can extend through this space and the walls of the orifice 8, for example on the broken line A—A in FIG. 3, such cables being removed to allow the device to be withdrawn. Thus the number of devices can be increased or they can be disposed near one another while it is still possible to construct a strong enough vessel.

I claim:
1. A heat extraction device for a nuclear reactor of the integral exchanger type, in which a pressure resistant vessel encloses a reactor core, a primary cooling fluid circuit for this core, and heat exchangers for a secondary fluid to extract heat from the primary fluid, this vessel having a plurality of orifices with each orifice being closed by a heat extraction device, each of said heat extraction devices comprising a single detachable plug supported in one of the vessel orifices, a blower for circulating the primary cooling fluid secured to the inner, central part of said plug, a heat exchanger axially spaced from said blower and plug and disposed with its axis in extension of the one of said blower, a cylindrical housing, disposed in alignment with said blower and said heat exchanger and with its axis coaxial with the one of said blower and of said heat exchanger, surrounding said blower and securing said heat exchanger to the plug, a straight conduit disposed concentrically within and spaced radially from said cylindrical housing and connecting the intake to the blower with the heat exchanger, and straight headers disposed parallel to the axis of said housing, blower and heat exchanger, for entry and exit of the secondary heat extraction fluid, such headers extending through the plug around the blower and into said housing and being connected adjacent one end, inside the housing, to the heat exchanger and being connectable at the other end to an external utilization circuit.

2. A device according to claim 1, wherein the primary cooling circuit includes a skirt with an opening and the heat exchanger includes a metal jacket which at the end remote from the plug is slidably connected to the skirt opening for guiding the flow of primary fluid into the heat exchanger.

3. A device according to claim 1, wherein the diameter of the plug is at least equal to that of the heat exchanger.

4. A device according to claim 1, wherein the headers are disposed some distance from the blower and co-operate to surround a passage for the extraction of the blower from the plug.

5. A device according to claim 4, comprising a plurality of rectilinear entry and exit headers for each exchanger circuit, said headers being mounted around the blower.

6. A device according to claim 1, wherein the plug has a pressure-resistant protecting wall, a thermal insulation on one side of said wall and a biological protection material on the other side of said wall.

7. A device according to claim 6, including a system for locking and sealing the plug in the vessel orifice.

8. A device according to claim 1, comprising on the blower a valve for closing the passage for the primary fluid in the event of shut-down of the extraction fluid circuit.

References Cited

UNITED STATES PATENTS

| | | | |
|---|---|---|---|
| 3,170,846 | 2/1965 | Blumberg | 176—60 |
| 3,182,002 | 5/1965 | Laithwaite et al. | 176—65 |
| 3,242,981 | 3/1966 | Hutchinson et al. | 176—65 X |

FOREIGN PATENTS

| | | |
|---|---|---|
| 866,037 | 4/1961 | Great Britain. |
| 900,821 | 7/1962 | Great Britain. |
| 940,919 | 11/1963 | Great Britain. |

REUBEN EPSTEIN, *Primary Examiner.*